May 29, 1934.     J. L. WILDE     1,960,964
APPARATUS FOR SHAPING AND PRESSING MEAT FOR COOKING
Filed July 30, 1932    2 Sheets-Sheet 1
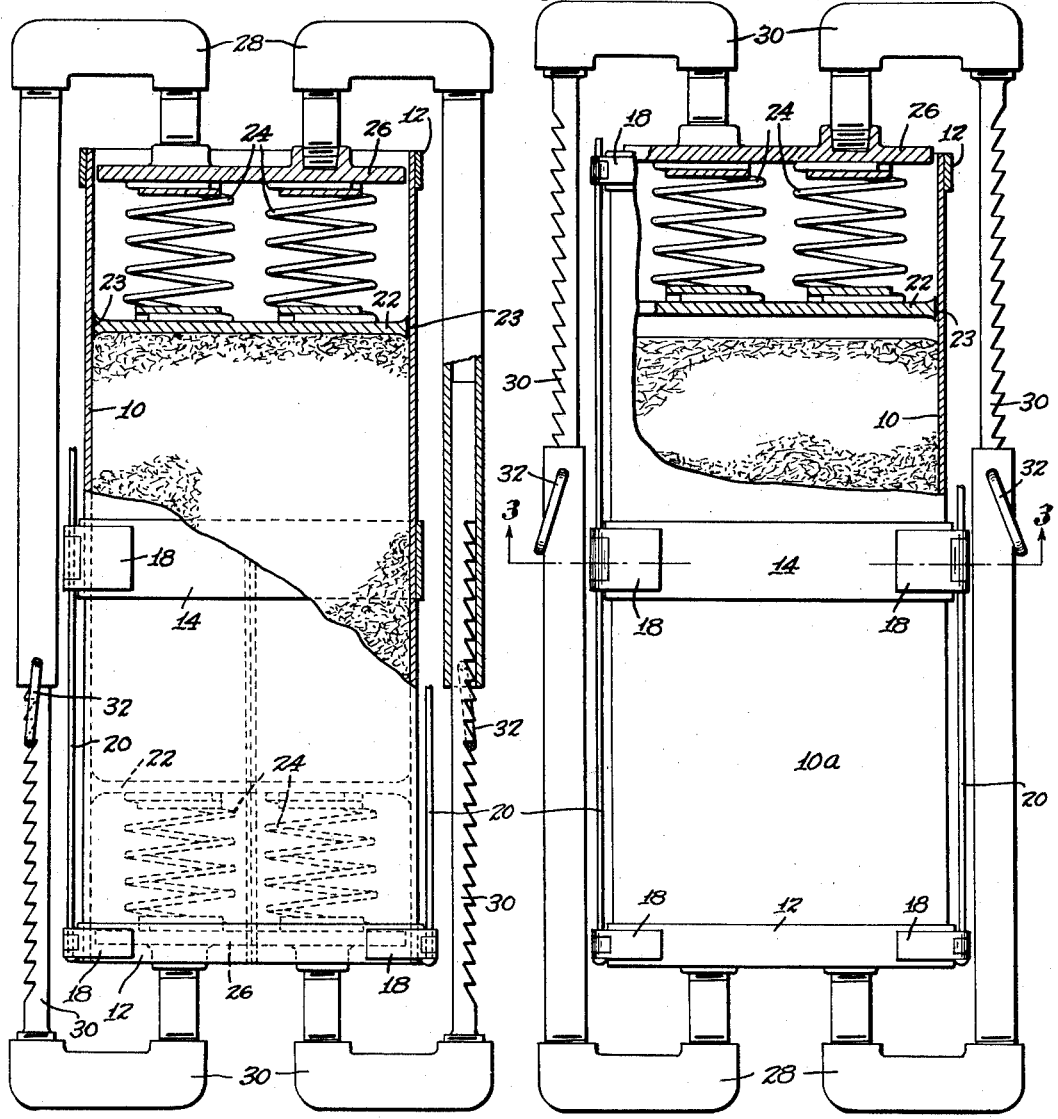
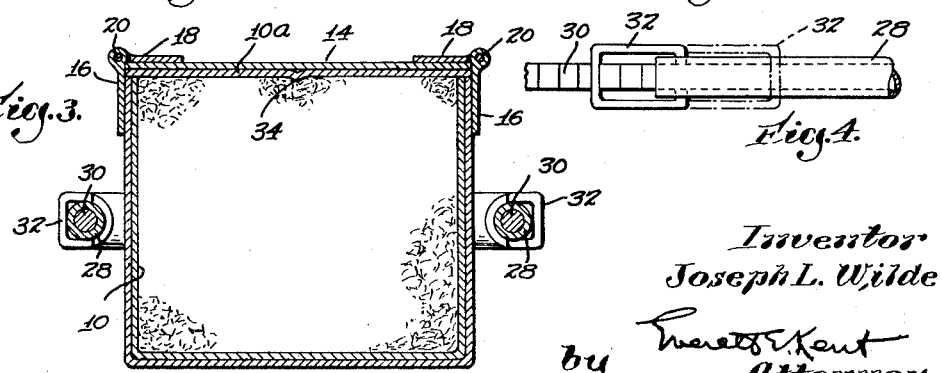
Fig.1.    Fig.2.    Fig.3.    Fig.4.
Inventor
Joseph L. Wilde
by
Attorney

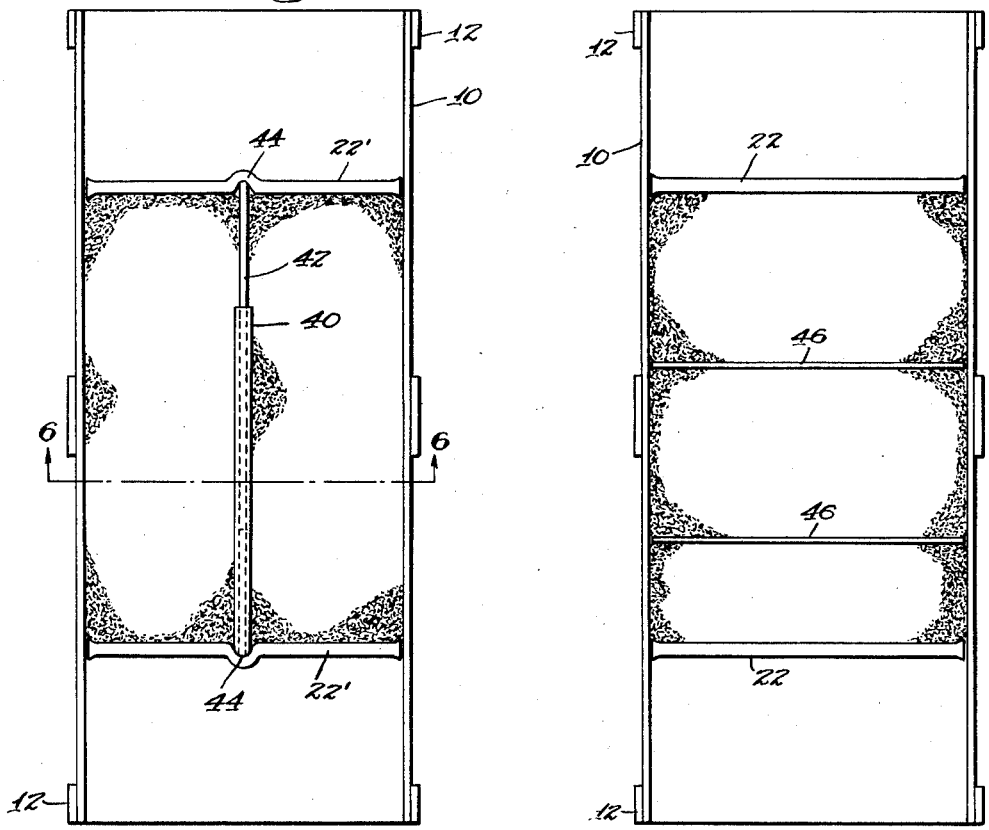
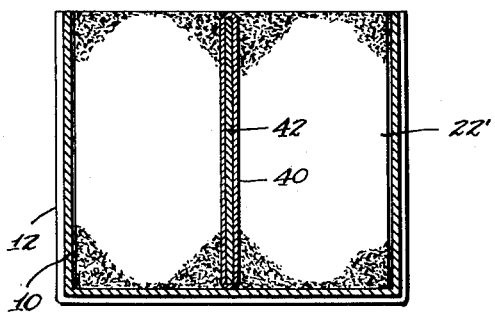

Patented May 29, 1934

1,960,964

UNITED STATES PATENT OFFICE 1,960,964

APPARATUS FOR SHAPING AND PRESSING MEAT FOR COOKING

Joseph L. Wilde, Pittsburgh, Pa.

Application July 30, 1932, Serial No. 626,389

4 Claims. (Cl. 100—57)

This invention relates to improvements in apparatus for shaping and pressing meat for cooking.

More especially it relates to devices for pressing irregular cuts into shapes in which the meat will have greater market value. One particular instance is that of cooked meats, such as hams, which are to be sliced for sandwiches. The invention facilitates the pressing and shaping of this meat before cooking; and it operates compressors automatically against it during the cooking, when incidental shrinkage occurs.

More important, however, is the provision for equalizing pressure through the entire body of meat, before as well as during the cooking, for uniform compactness.

Another feature is improved external mechanism which at a touch will lock and release the compressors automatically, and with certainty, and so, by saving labor time will reduce cost of the finished meat. These and other features that characterize the apparatus hereinafter described make the device as a whole much superior to all other mechanisms now known to me, both as regards effectiveness on the meat and as regards ease of operating and handling.

It has heretofore been recognized as desirable to equalize the shaping pressure throughout the body of meat. The danger is that portions at a mid-area, or near an end, may be uncompressed and uncompacted; and that these portions may crumble in the slicing. But in methods heretofore employed, pressure has been applied almost entirely at one end of the meat. This pressure is indeed applied longitudinally, but the plasticity of the meat, coupled with its friction against the container walls, converts that longitudinal pressure into a radial pressure against the side walls; and this increases the side wall friction, and so prevents the entire body of meat from sliding along. Thus even when a compression spring is provided at each end, only the first end can be fully compacted, other portions being left insufficiently compacted and in condition to crumble when slicing is attempted.

Also prior devices have involved complications of construction and operation, and have not functioned with the ease and aptitude which is desirable from a standpoint of practical commercial operation. And the difficulties and expense involved, to clean them thoroughly after use, has caused many to be used while in unsanitary condition.

It is therefore among the objects of the present invention to provide meat-shaping apparatus wherein all portions of the meat may be compacted to a more uniform degree; to provide the said automatic locking and releasing mechanism; and to provide for the container to be cleaned readily to maintain a desired sanitary condition.

It is, moreover, an important feature that my improved device may be made economically.

The invention employs a pair of compressors operable on opposite ends of meat in a tubular container. The container may be of any suitable shape in cross section, usually rectangular. Having length somewhat greater than the meat pieces to be treated, the open ends of the container are closed by the compressors. To permit insertion of the meat, and to facilitate thorough cleaning of the interior, a side wall of the tubular container will be removable, as a cover.

The compressors, one in each end of the container, each have a yoke whose arms reach out to the sides, and there extend, one exteriorly along each side of the container, unattached thereto. On one compressor the yoke arms which extend along the sides of the container are tubes; while on the other compressor the corresponding arms are ratchet rods which telescope into the said tubes. Each tube has a link-pawl to fall against and hold the ratchet part of its inserted rod,—when the apparatus is standing on end with the tube part of this arrangement upmost.

Coil springs intervene between each compressor plate and its yoke. When heavy inward pressure is applied to both yokes, the springs become compressed. Thus, by standing the device on end and pushing down on it, one can compress them and compress meat between them; and the pawls fall to engage their ratchet rods and hold them so. The springs are thus left urging the yokes apart; but that pressure merely tends to hold the rods in engagement with their pawls. Having their outward ends immovable, held by the pawls, expansive pressure of the same springs is equally delivered inward against the meat. Thus a single application of pressure causes the whole body of meat to be compressed from both ends; and leaves the springs effective to follow up any contraction of the meat which may be incident to its cooking.

By standing the device on end, overturned, with ratchet rods above their tubes, applied pressure will release the U-pawls and let gravity pull them free. Thus unlatched, the compressors may be withdrawn, and the container cover be opened to remove the shaped and cooked meat and to clean the interior.

It is intended that the patent shall cover, by suitable expression in the appended claims, whatever features of patentable novelty exist in the invention disclosed.

In the accompanying drawings:

Figure 1 is a side elevation of one embodiment of the invention showing meat under compression, and the compressors latched; with the upper portion in medial, vertical section;

Figure 2 is a similar view, overturned, showing the compressors released;

Figure 3 is a section on 3—3 of Figure 2; and

Figure 4 is a detail of a pawl and ratchet latch.

Figure 5 is an elevation of parts, as in Figure 1, but with the cover 10a removed, showing an optional telescoping dividing wall 40, 42;

Figure 6 is an end elevation of the same, in section on line 6—6; and

Figure 7 is also an elevation of parts, as in Figure 1, with the cover 10a removed, showing a different optional arrangement of interior partitions.

Referring to the drawings, the container 10 may be of any suitable material and of any suitable shape. As represented it is of non-rusting sheet metal construction, and is in the form of a rectangular tube of which one side 10a is openable as a cover. Reenforcing straps of metal 12, and 14 may extend exteriorly around the ends and middle portion; and corresponding short straps may be provided on the cover. Cooperating hinge-brackets 16, 18 may be provided for these straps at the edges of the cover, with removable long hinge-pins 20 for securing the cover on the container. Removal of a pin 20 permits opening of the cover on the hinge at the opposite side.

Compressor plates 22 each constitute a movable end wall, fitting nicely but slidably, with marginal flanges 23 to guide them during movements within the tube. Each compressor plate 22 is backed by compression means, which conveniently may be one or more coil springs 24, carried by the respective outer plates 26, each of which latter has a yoke 28 or 30, which reaches up (or down), out of the container end, out transversely on a diameter in both directions thereof to beyond the periphery of the container, and thence exteriorly, back along side walls of the container to beyond its middle. The arms 28 preferably will be tubular, while the arms 30 are rods which telescope in the tubes 28, and have ratchet teeth. Thus when the compressor plates 22 are pressed inward, toward each other, their yoke rods telescope together. And a U-link 32 at the end of each arm 28 is hung as a pawl to engage or disengage automatically its respective arm ratchet 30, to latch the yokes against any spreading apart. But, because of the springs 24 which were compressed, the compressor plates continue to be constantly pressing together to compact the meat if any shrinkage in it occurs.

Each compressor plate 22 is movable into compressing engagement with meat in the container 10 without regard to movement of the other and opposite plate. Thus each compacts at least the meat which is at its end, and the combined effect is the substantially uniform compacting of the whole. Any frictional binding of meat against wall at mid-areas becomes of little account because the compressors individually travel toward the meat, with no need that one must have pushed the entire body of meat toward the other before the latter becomes effective.

In operation, the cover 10a will be opened to permit insertion of the piece of meat which is to be treated. Then, after closing the cover, the pin 20, inserted through the hinge-bracket 16, will effectively secure it in closed relation. Standing the device on its ratchet rod end, as seen in Figure 1, and applying downward pressure to the upper end, drives both compressor plates inward in container 10 into equal compressive contact with the meat, incidentally compacting the plastic meat and reshaping it into the shape of the container. Simultaneously the ratchets 30 telescope into their respective tubular arms 28. And each pawl or U-link 32, by gravity, automatically rides along over the ratchet and engages the last tooth passed, and so holds the compressor plates in their pressed-in relation.

Thus locked, the device is ready for cooking. A substantial number of the shapers being ordinarily placed together in the cook-container, each maintains its contained meat substantially free from contact with the liquid, so that the cooking is accomplished by the heat alone.

After cooking, the device is to be stood on its opposite end, as seen in Figure 2, with the ratchets 30 uppermost. Pressure applied at the top lets the U-links fall by gravity out of engagement. The yokes and the compressors are thus freed, and may be drawn apart; the cover 10a be opened, and the shaped and cooked meat be removed. If it is desired to clean the device, the compressors will be drawn entirely out of the container 10 and may be easily and thoroughly cleaned. Likewise the container 10 may be readily cleaned interiorly.

As illustrated, the coil springs 24 each have one end secured to a compressor plate 22, and its other end secured to an outer plate 26. With this construction the compressor plates may be drawn out of container 10 as the arms 28, 30 are drawn apart. Obviously the compressor plates may be unattached to the springs, or may be secured thereto by other means than that illustrated.

For the convenience of the retailer, or other user of meat, one or more longitudinally extending central lines may be impressed in the shaped meat, as markers for cutting the piece of meat exactly in half, in thirds, etc. Such a mark or marks may be obtained by means of a rib 34 suitably located along the interior surface of the cover 10a. During the shaping, this rib will impress its contour into the meat, as a permanent guide for cutting.

The invention thus assures a more readily marketable product; eliminates waste; facilitates handling and operation; and, withal, is constructed on principles which take into account the need for cleanliness and sanitation, providing for thorough cleansing of all parts of the device with ease and despatch. Also the permitted economical construction is a distinct advantage. Pieces of pipe, and standard pipe fittings, may be used, for the yokes 28, 30 with a suitable casting joining the arms of each yoke.

Optional construction which adds to the all around utility of the apparatus is shown in Figures 5 and 7. In these, which are shown separately from Figure 1 in order to avoid confusion in the drawings, the part surrounding what is shown may be as in Figure 1, and therefore I will not illustrate it; and the plates, 22' and 22 of Figures 5 and 7 correspond to the plates 22 Figure 1. In Figure 5 the corresponding plates 22' are formed with a groove in each of the presser plates 22', which as illustrated is a medial groove, to constitute a seat at each end of the apparatus for the ends of a telescoping medial partition 40, 42. The apparatus can be used with or without this partition; and plate 22' might be made with several grooves so that partitions could be put in a selected location. The effect is to make the apparatus useful either for one large piece of meat, as a large ham, when the partition is taken out, or usable for two small hams, one on each side of the partition, or any other kind of meat can be thus processed, being cooked in long pieces of rectangular cross-section. In the absence of the partition 40, 42, the groove 44 will make a mark on the contained meat similar in effect to that made by the ridge 34, although protruding instead of being a groove, for sandwich style.

Figure 7 has end presser plates 22 as in Figure 1 and has cross partitions 46 which are loose, so that two or more pieces of raw meat can be introduced, pressed and cooked so that when finished each will be in a brick shape and all will have been suitably compressed before and during the cooking.

I claim as my invention:

1. Apparatus for shaping meat comprising a tubular, open-ended container; compressor plates operable, one in each end of the container; a plurality of frame sections, each including a portion extending crosswise of an end of said container, and each including portions extending exteriorly along the container, for engaging with the other said section; and, at each end, means connecting the plate and the frame section which are at that end; there being on each said frame section a member engaging the connecting means and having a surface facing inward, and said crosswise portion having a surface facing outward, which is the outmost surface of that end of the apparatus; whereby with the apparatus standing on one of said outmost surfaces, a depressing of the other will urge said plates simultaneously inward from both ends of the container.

2. Apparatus for shaping meat comprising a tubular, open-ended container; compressor plates operable, one in each end of the container; a plurality of frame sections, each including a portion extending crosswise of an end of said container, and each including portions extending exteriorly along the container, for engaging with the other said section; and, at each end, a spring yieldingly connecting the plate and the frame section which are at that end; there being on each said frame section a member engaging the connecting spring and having a surface facing inward, and said crosswise portion having a surface facing outward, which is the outmost surface of that end of the apparatus; whereby with the apparatus standing on one of said outmost surfaces, a depressing of the other will urge said plates simultaneously inward from both ends of the container; and a ratchet effective at said inter-engaging portions for preventing spreading apart of said plates.

3. Apparatus for shaping meat comprising a tubular, open-ended container; compressor plates operable, one in each end of the container; a frame with a portion extending across each end of the container and with telescoping portions at each side of the container and, at each end, a coil spring intervening between the plate and the frame; there being on the frame, at each end, a member engaging the connecting spring and having a surface facing inward, and said crosswise portion having a surface facing outward, which is the outmost surface of that end of the apparatus; whereby the apparatus standing on one of said outmost surfaces, a depressing of the other will urge said plates simultaneously inward from both ends of the container; and ratchet means at each said telescoping portion of frame, for locking the frame in pressed-in relation against the compression of said springs.

4. Apparatus for shaping meat comprising a tubular, open-ended container; compressor plates operable, one in each end of the container; a pair of U-shaped frame sections, one for each end of the container, one said section having its parallel arms of the U adapted to overlie the parallel arms of the U of the other said section; an engaging device for holding the U-frames together; the cross portion of each U-frame having a surface facing inward, and having another surface facing outward, which is the outmost surface of that end of the apparatus; and means entirely within the confines of the frame sections permanently connecting said plates operably to the frame, and comprising springs permanently intervening between each said compressor plate and said inward facing surface of the cross portion of its U-frame; said engaging device, when the container stands on one end, being adapted to fall by gravity into engaging position to prevent longitudinal spread, and, when the container stands on the opposite end, and pressure is applied exteriorly to the frame, being gravity actuated out of the said engaging position.

JOSEPH L. WILDE.